US010895843B2

United States Patent
Hong et al.

(10) Patent No.: US 10,895,843 B2
(45) Date of Patent: Jan. 19, 2021

(54) SYSTEM, DEVICES, AND METHODS FOR DIGITAL HOLOGRAPHY

(71) Applicant: REGENTS OF THE UNIVERSITY OF MINNESOTA, Minneapolis, MN (US)

(72) Inventors: Jiarong Hong, New Brighton, MN (US); Santosh Kumar Sankar, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 0 days.

(21) Appl. No.: 16/290,308

(22) Filed: Mar. 1, 2019

(65) Prior Publication Data
US 2019/0332054 A1 Oct. 31, 2019

Related U.S. Application Data

(60) Provisional application No. 62/637,543, filed on Mar. 2, 2018.

(51) Int. Cl.
*G03H 1/04* (2006.01)
*G03H 1/08* (2006.01)
(Continued)

(52) U.S. Cl.
CPC .......... *G03H 1/0866* (2013.01); *G01P 5/001* (2013.01); *G03H 1/0443* (2013.01); *G03H 2001/0033* (2013.01)

(58) Field of Classification Search
CPC ........ G03H 1/0443; G03H 2001/0447; G03H 2001/045; G03H 2001/0452
See application file for complete search history.

(56) References Cited

U.S. PATENT DOCUMENTS 4,572,667 A 2/1986 Rogers
5,532,814 A 7/1996 Cha
(Continued)

FOREIGN PATENT DOCUMENTS

EP 0436125 A1 7/1991

OTHER PUBLICATIONS

Petruck, et al., "Partially Coherent Light-Emitting Diode Illumination for Video-Rate In-Line Holographic Microscopy", Applied Optics, vol. 51, No. 13, May 1, 2012, pp. 2333-2340.
(Continued)

*Primary Examiner* — Jonathan M Hansen
(74) *Attorney, Agent, or Firm* — Michael A. Collins; Billion & Armitage

(57) ABSTRACT

Systems, devices, and methods are described herein for performing digital holography to analyze dynamics of fluid flow. According to some aspects of this disclosure, a Digital Fresnel Reflection Holography (DFRH) system, which is arranged to utilize light backscattered from particles in a fluid chamber to create a hologram that may be processed to analyze characteristics of fluid flow. The DFRH system may utilize light reflected from an imaging window disposed between a light source and a sampling volume, to be analyzed as a reference wave, to form an interference pattern and resultant hologram. According to some aspects of this disclosure, the DFRH techniques may provide simple, cost-effective mechanisms with improved performance over other techniques for analyzing fluid flow using holography.

16 Claims, 12 Drawing Sheets

(51) Int. Cl.
*G01P 5/00* (2006.01)
*G03H 1/00* (2006.01)

(56) References Cited

U.S. PATENT DOCUMENTS

| | | | |
|---|---|---|---|
| 5,548,419 | A | 8/1996 | Adrian et al. |
| 5,905,568 | A | 5/1999 | Mcdowell et al. |
| 6,078,392 | A | 6/2000 | Thomas et al. |
| 9,632,299 | B2* | 4/2017 | Sun .......................... G02B 21/06 |
| 2013/0093871 | A1* | 4/2013 | Nowatzyk .............. G02B 21/14 348/79 |
| 2013/0278981 | A1* | 10/2013 | Huys ..................... G03H 1/0402 359/10 |
| 2014/0220622 | A1 | 8/2014 | Twardowski et al. |
| 2017/0219998 | A1 | 8/2017 | Hong et al. |
| 2017/0309036 | A1* | 10/2017 | Perraut ................. G03H 1/0005 |

OTHER PUBLICATIONS

Royer, "An Application of High-Speed Microholography: The Metrology of Fogs", Nouvelle Revue d' Optique, vol. 5, No. 20, 1974, pp. 87-93.

Sarder, et al., "Deconvolution Methods for 3-D Fluorescence Microscopy Images", IEEE Singal Processing Magazine, vol. 23, May 2006, pp. 32-45.

Schanz, et al., "'Shake the Box': A Highly Efficient and Accurate Tomographic Particle Tracking Velocimetry (TOMO-PTV) Method using Prediction of Particle Positions", 10th International Symposium on Particle Image Velocimetry-PIV13, Jul. 1-3, 2013, 13 pages.

Sheng, et al., "Buffer Layer Structures Associated With Extreme Wall Stress Events in a Smooth Wall Turbulent Boundary Layer", Journal of Fluid Mechanics, vol. 633, 2009, pp. 17-60.

Sheng, et al., "Digital Holographic Microscope for Measuring Three-Dimensional Particle Distributions and Motions", Applied Optics, vol. 45, No. 16, 2006, pp. 3893-3901.

Sheng, et al., "Using Digital Holographic Microscopy for Simultaneous Measurements of 3D Near Wall Velocity and Wall Shear Stress in a Turbulent Boundary Layer", Experiments in Fluids, vol. 45, 2008, pp. 1023-1035.

Shimobaba, et al., "Real-Time Digital Holographic Microscopy Using the Graphic Processing Unit", Optic Express, vol. 16, No. 16, Aug. 4, 2008, pp. 11776-11781.

Singh, et al., "Automatic Threshold Technique for Holographic Particle Field Characterization", Applied Optics, vol. 51, No. 17, Jun. 10, 2012, pp. 3874-3887.

Singh, et al., "Three-Dimensional Investigation of Liquid Slug Taylor Flow Inside a Micro-Capillary Using Holographic Velocimetry", Experiments in Fluids, vol. 56, No. 6, 2015, pp. 1-15.

Slimani, et al., "Near-field Lorenz-Mie Theory and its Application to Microholography", Applied Optics, vol. 23, No. 22, Nov. 15, 1984, pp. 4140-4148.

Soulez, et al., "Inverse Problem Approach for Particle Digital Holography: Accurate Location Based on Local Optimisation", Journal of Optical Society of America A, vol. 24, No. 4, 2007, pp. 1164-1171.

Subedi, et al., "Backscatter Digital Holography of Microparticles", Optics Express, vol. 21, No. 10, May 20, 2013, pp. 12611-12616.

Talapatra, et al., "Three-Dimensional Velocity Measurements in a Roughness Sublayer Using Microscopic Digital in-line Holography and Optical Index Matching", Measurement Science and Technology, vol. 24, 024004, 2013, pp. 1-11.

Tanaka, et al., "Reduction of Reconstructed Particle Elongation Using Iterative Min-Max Filtering in Holographic Particle Image Velocimetry", 17th International Symposium on Applications of Laser Techniques to Fluid Mechanics, Jul. 7-10, 2014, pp. 1-6.

Tian, et al., "Quantitative Measurement of Size and Three-Dimensional Position of Fast-Moving Bubbles in Air-Water Mixture Flows Using Digital Holograpy", Applied Optics, vol. 49, No. 9, Mar. 20, 2010, pp. 1549-1554.

Toloui, et al., "High Fidelity Digital Inline Holographic Method for 3D Flow Measurements", Optics Express, vol. 23, No. 21, Oct. 19, 2015, pp. 27159-27173.

Toloui, et al., "Improvements on Digital Inline Holographic Ptv for 3D Wall-Bounded Turbulent Flow Measurements", Measurement Science and Technology, vol. 28, Article 44009, 2017, pp. 1-15.

Wilert, et al., "Three-Dimensional Particle Imaging With a Single Camera", Experiments in Fluids, vol. 12, 1992, pp. 353-358.

Yang, et al., "Depth-of-Focus Reduction for Digital in-line Holography of Particle Fields", Optic Letters, vol. 30, No. 11, Jun. 1, 2005, pp. 1303-1305.

Zhang, et al., "Influence of Some Recording Parameters on Digital Holographic Particle Image Velocimetry", Optical Engineering, vol. 45, No. 7, Jul. 2006, pp. 075801-1-075801-10.

Zhang, et al., "Turbulent Flow Measurement in a Square Duct With Hybrid Holographic PIV", Experiments in Fluids, vol. 23, 1997, pp. 373-381.

Adrian, et al., "Particle Image Velocimetry", No. 30, Cambridge University Press, 2011, Figure 2.5, 1 page.

Adrian, "Twenty years of Particle Image Velocimetry", Experiments in Fluids, vol. 39, Jul. 6, 2005, pp. 159-169.

Agard, "Optical Sectioning Microscopy: Cellular Architecture in Three Dimensions", Annual Review of Biophysics and Bioengineering, vol. 13, 1984, pp. 191-219.

Ahrenberg, et al., "Using Commodity Graphics Hardware for Real-Time Digital Hologram View-Reconstruction", Journal of Display Technology, vol. 5, 2009, pp. 1-9.

Allano, et al., "Three-Dimensional Velocity Near-Wall Measurements by Digital in-line Holography: Calibration and Results", Applied Optics, vol. 52, No. 1, Jan. 1, 2013, pp. A9-A17.

Arroyo, et al., "Recent Developments of PIV towards 3D Measurements", Topics in Applied Physics, vol. 112, 2008, pp. 127-154.

Barnhart, et al., "Phase-Conjugate Holographic System for High-Resolution Particle-Image Velocimetry", Applied Optics, vol. 33, No. 30, Oct. 20, 1994, pp. 7159-7170.

Brady, et al., "Compressive Holography", Optics Express, vol. 17, No. 15, Jul. 20, 2009, pp. 13040-13049.

Burns, et al., "Data Extraction from Underwater Holograms of Marine Organisms", Oceans 2007—Europe (IEEE), 2007, pp. 1-6.

Cao, et al., "Hybrid Digital Holographic Imaging System for Three-Dimensional Dense Particle Field Measurement", Applied Optics, vol. 47, No. 25, Sep. 1, 2008, pp. 4501-4508.

Cuche, et al., "Digital Holography for Quantitative Phase-Contrast Imaging", Optics Letters, vol. 24, No. 5, Mar. 1, 1999, pp. 291-293.

Discetti, et al., "Volumetric Velocimetry for Fluid Flows", Measurement Science and Technology, vol. 29, 2018, pp. 1-48.

El Mallahi, et al., "Automated Three-Dimensional Detection and Classification of Living Organisms Using Digital Holographic Microscopy With Partial Spatial Coherent Source: Application to the Monitoring of Drinking Water Resources", Applied Optics, vol. 52, No. 1, Jan. 1, 2013, pp. A68-A80.

Elsinga, "Complete Removal of Ghost Particles in Tomographic-PIV", 10th International Symposium on Particle Image Velocimetry (PIV13), Jul. 1-3, 2013, 9 pages.

Endo, et al., "GPU-Accelerated Compressive Holography", Optics Express, vol. 24, No. 8, Apr. 18, 2016, pp. 8437-8445.

Cheong, et al., "Strategies for Three-Dimensional Particle Tracking with Holographic Video Microscopy", Optics Express, vol. 18, 2010, 11 pages.

Fugal, et al., "Cloud Particle Size Distributions Measured With an Airborne Digital In-Line Holographic Instrument", Atmospheric Measurement Techniques, vol. 2, 2009, pp. 259-271.

Elsinga, et al., "Tomographic Particle Image Velocimetry", Experiments in Fluids, vol. 41, 2006, pp. 933-947.

Gao, "Development and Applications of Digital Holography to Particle Field Measurement and in Vivo Biological Imaging", PhD Dissertation, Purdue University, 2014, 184 pages.

Gass, et al., "Phase Imaging Without 2π Ambiguity by Multiwavelength Digital Holography", Optics Letters, vol. 28, No. 13, Jul. 1, 2003, pp. 1141-1143.

(56) References Cited

OTHER PUBLICATIONS

Ghaemi, et al., "Turbulent Structure of High-Amplitude Pressure Peaks within the Turbulent Boundary Layer", Journal of Fluid Mechanics, vol. 735, 2013, pp. 381-426.

Gire, et al., "Digital Holography of Particles: Benefits of the "Inverse Problem" Approach", Measurement Science and Technology, vol. 19, 2008, pp. 1-21.

Goodman, "Introduction to Fourier Optics", McGraw-Hill, 1968, 457 pages.

Graham, et al., "A Web Services-Accessible Database of Turbulent Channel Flow and its use for Testing a New Integral Wall Model for LES", Journal of Turbulence, vol. 17, No. 1, 2016, pp. 179-213.

Gray, et al., "A Processing System for the Analysis of Particle Displacement Holograms", SPIE, vol. 2005, 1993, pp. 636-647.

Guildenbecher, et al., "Digital Holography Reconstruction Algorithms to Estimate the Morphology and Depth of Nonspherical Absorbing Particles", Proceedings of Spie, Optical Engineering Applications, International Society for Optics and Photonics, vol. 8493, 2012, pp. 849303-1-849303-12.

Hart, "High-Speed PIV Analysis Using Compressed Image Correlation", Journal of Fluids Engineering, vol. 120, Sep. 1998, pp. 463-470.

Hecht, "Optics 4th Edition", Addison Wesley Publishing Company, 2001, 704 pages.

Herrmann, et al., "Light-in-Flight Holographic Particle Image Velocimetry for Wind-Tunnel Applications", Measurement Science and Technology, vol. 15, 2004, pp. 613-621.

Herrmann, et al., "Light-in-Flight Holographic Particle Image Velocimetry for Wind-tunnel Applications: Off-Site Reconstruction of Deep-Volume Real Particle Images", Measurement Science and Technology, vol. 15, 2004, pp. 1-9.

Hori, et al., "High-Speed Scanning Stereoscopic PIV for 3D Vorticity Measurement in liquids", Measurement Science Technology, vol. 15, No. 6, 2004, pp. 1067-1078. and.

Ichihashi, et al., "Real-time Capture and Reconstruction System with Multiple GPUs for a 3D Live Scene by a Generation from 4K IP Images to 8K Holograms", Optics Express, vol. 20, No. 10, 2012, pp. 21645-21655.

Hong, et al., "Algal Toxins Alter Copepod Feeding Behavior", PloS One, vol. 7, No. 5, May 18, 2012, pp. 1-13.

Crocker et al., "Methods of Digital Video Microsopy for Colloidal Studies", Journal of Colloid and Interface Science, vol. 179, Article No. 0217, 1996, pp. 298-310.

Katz, et al., "Applications of Holography in Fluid Mechanics and Particle Dynamics", Annual Review of Fluid Mechanics, vol. 42, 2010, pp. 531-555.

Kim, et al., "Effect of Particle Number Density in In-Line Digital Holographic Particle Velocimetry", Experiments in Fluids, vol. 44, 2008, pp. 623-631.

Lai, et al., "Volumetric Three-Component Velocimetry: A New Tool for 3D Flow Measurement", 14th International Symposium on Applications of Laser Techniques to Fluid Mechanics, Jul. 7-10, 2008, pp. 1-12.

Latychevskaia, et al., "Depth-Resolved Holographic Reconstructions by Three-Dimensional Deconvolution", Optic Express, vol. 18, No. 21, 2010, pp. 22527-22544.

Latychevskaia, et al., "Holographic Time-Resolved Particle Tracking by Means of Three-Dimensional Volumetric Deconvolution", Optic Express, vol. 22, 2014, 11 pages.

Lee, et al., "Field-Portable Reflection and Transmission Microscopy Based on Lensless Holography", Biomedical Optics Express, vol. 2, No. 9, Sep. 1, 2011, pp. 2721-2730.

Li, et al., "A Public Turbulence Database Cluster and Applications to Study Lagrangian Evolution of Velocity Increments in Turbulence", Journal of Turbulence, vol. 9, 2008, pp. 1-30.

Dixon, et al., "Holographic Deconvolution Microscopy for High-Resolution Particle Tracking", Optic Express, vol. 19, 2011, 8 pages.

Lozano, et al., "Use of Holography in Particle Image Velocimetry Measurements of a Swirling Flow", Experiments in Fluids, vol. 27, 1999, pp. 251-261.

Malek, et al., "Digital in-line Holography: Influence of the Shadow Density on Particle Field Extraction", Optic Express, vol. 12, No. 10, May 17, 2004, pp. 2270-2279.

Meng, et al., "Holographic Particle Image Velocimetry: From Film to Digital Recording", Measurement Science and Technology, vol. 15, 2004, pp. 673-685.

Meng, et al., "Intrinsic Speckle Noise in In-Line Particle Holography", Journal of Optical Society of America A, vol. 10, No. 9, Sep. 1993, pp. 2046-2058.

Rahman et al., "Effect of Particle Concentration and Turbidity on Particle Characterization using Digital Holography", Chemical Engineering Research and Design, vol. 92, 2014, pp. 249-255.

Orzo, et al., "GPU Implementation of Volume Reconstruction and Object Detection in Digital Holographic Microscopy", IEEE, 2010 12th International Workshop on Cellular Nanoscale Networks and Their Applications (CNNA), 2010, pp. 1-4.

Pan, et al., "Digital Holography of Particle Fields: Reconstruction by Use of Complex Amplitude", Applied Optics, vol. 42, No. 5, Feb. 10, 2003, pp. 827-833.

Pereira, et al., "Two-Frame 3D Particle Tracking", Measurement Science and Technology, vol. 17, 2006, pp. 1680-1692.

\* cited by examiner

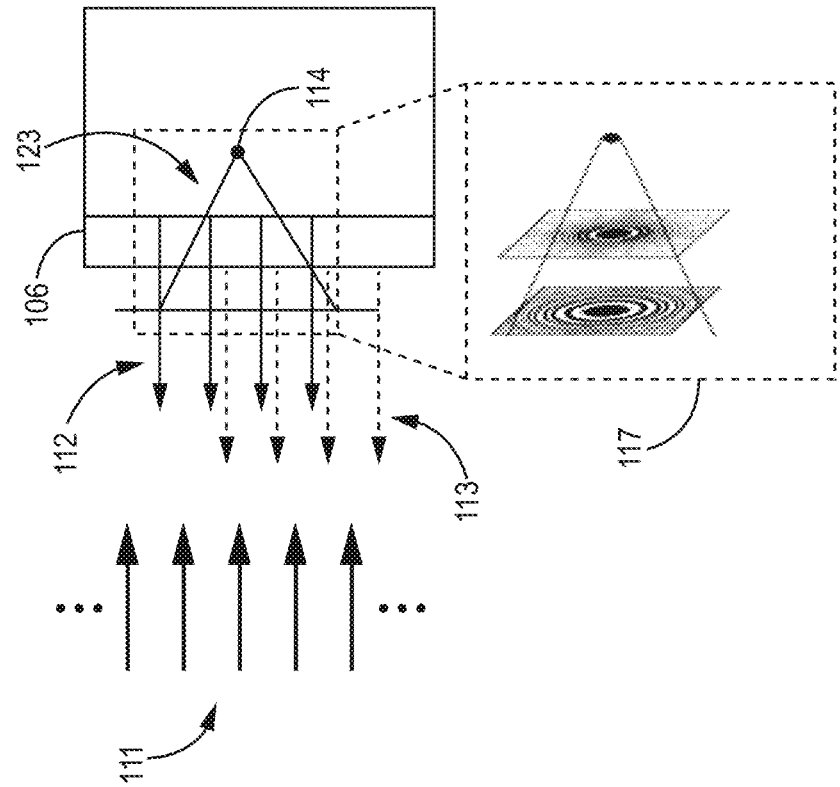
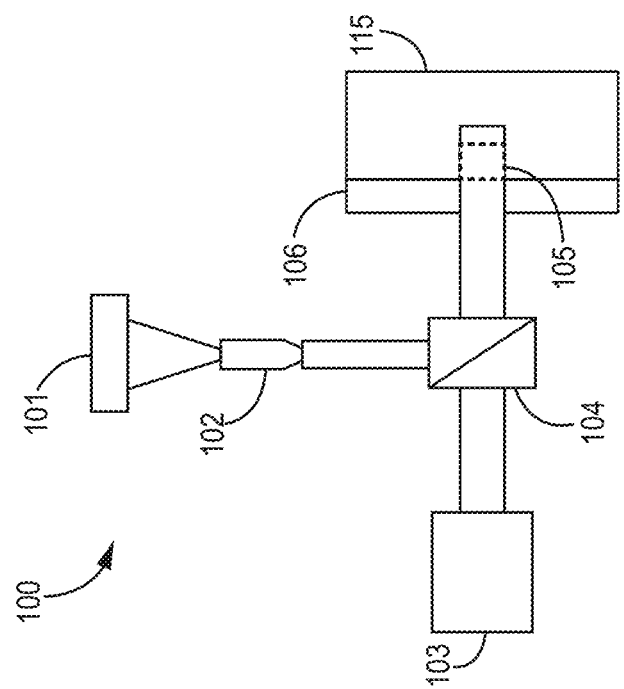
FIG. 1B
FIG. 1A

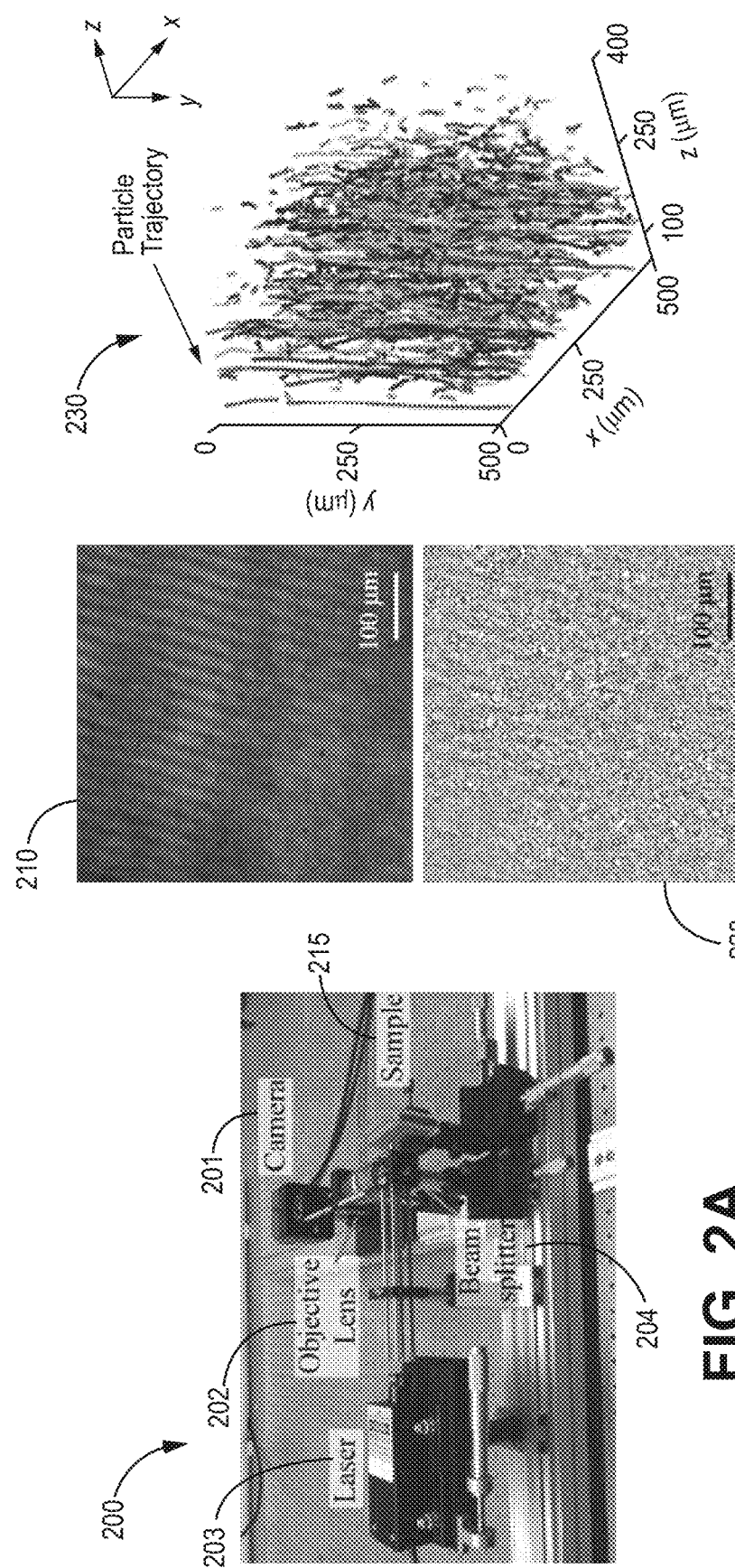

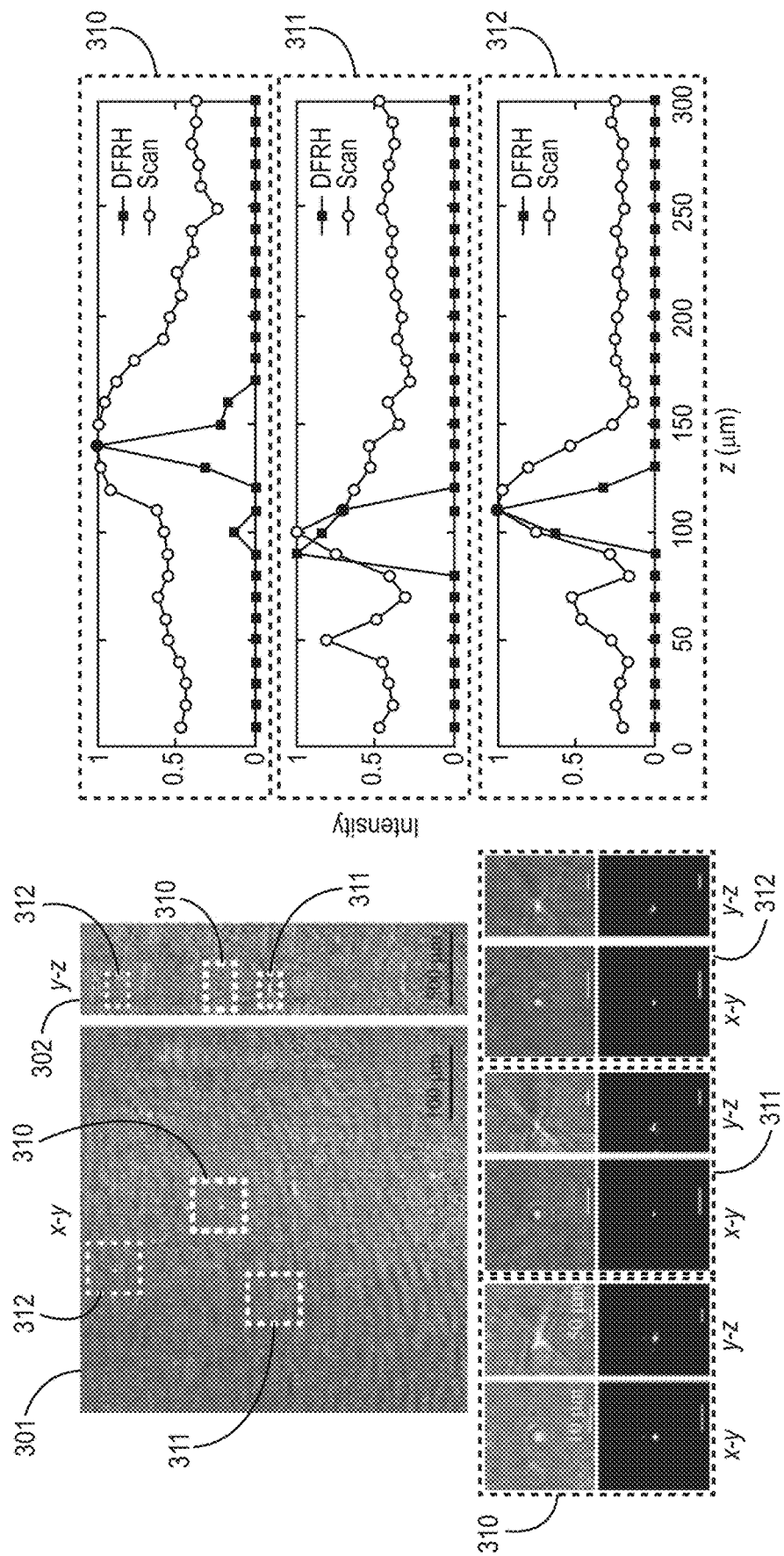

SYSTEM, DEVICES, AND METHODS FOR DIGITAL HOLOGRAPHY

STATEMENT REGARDING FEDERALLY SPONSORED RESEARCH

This invention was made with government support under grant numbers N00014-16-1-2755 awarded by Office of Naval Research. The government has certain rights in the invention.

TECHNICAL FIELD

The present disclosure is related generally to holography systems and methods, and in particular to using holography systems and methods for particle image velocimetry applications.

BACKGROUND

Particle based diagnostic techniques such as particle image velocimetry (PIV) and particle tracking velocimetry (PTV) are routinely employed to understand the dynamics of fluid motion. In general, PIV/PTV involve "seeding" the flow with tracer particles that can be imaged and tracked over space and time.

One technique for performing PTV is based on Digital Inline Holography (DIH), referred to as DIH-PTV hereafter. DIH-PTV has emerged as a compact and low-cost alternative to probe three-dimensional flows. DIH-PTV employs a laser beam to illuminate a flow field with tracer particles, and a single digital camera to capture interference between forward scattered light (from tracers) and the undiffracted portion of a beam as a hologram. Particularly, the use of forward scattering lowers the requirements on laser power, while the recorded 2D hologram that encodes 3D information of tracers, eliminates the need for multiple cameras. The hologram is numerically reconstructed by convolving with a diffraction kernel (e.g., Raleigh Sommerfeld or Kirchhoff—Fresnel kernel) which simulates the propagation of light. Such a process creates intensity cross sections of the illuminated particles in the sampling volume at different longitudinal distances, i.e., a reconstructed 3D intensity field. Finally, through appropriate thresholding & segmentation routines, particle positions can be extracted and tracked over time to extract a 3D flow field.

DIH-PTV has significant advantages over other 3D PIV/PTV techniques, in terms of its compactness and cost, however it still suffers from several drawbacks limiting its broad applications in flow measurements. The first and most important of these is the longitudinal elongation observed in the reconstructed particles, due to an extended depth-of-focus and signal truncation associated with discrete sampling in DIH, limiting longitudinal resolution. Second, the need for capturing interference limits the maximum particle concentration, in order to maintain a sufficient level of signal-to-noise ratio (SNR). As tracer concentration is increased with the goal of achieving high spatial resolutions, the corresponding noise generated from cross interference of a signal (i.e. from adjacent particles and particles outside the sampling volume, but within the laser path) goes up. At its extreme limit of concentration, the recorded hologram contains only a statistical speckle pattern, with no clear way to discriminate individual particles for processing. In order to quantify the effect of particle concentration and sample depth on the SNR of holograms and extraction efficiency of DIH, shadow density (SD), i.e., $SD = C_p \times t \times d_p^2 \times 100$ ($C_p$—particle concentration, t—the thickness of the sampling volume and $d_p$—particle diameter), is introduced. Prior studies have reported a significant drop in hologram quality and particle extraction efficiency (~20%) as SD approaches 10% (Malek et al., 2004). Other PIV/PTV techniques do not suffer from similar speckle-based limitations as they directly record scattered intensity and not an interference pattern. Though some recent improvements in processing algorithms have substantially improved our ability to process holograms with relatively low SNR for DIH-PTV, they are insufficient to handle the holograms with SD comparable to other PIV techniques. Such an increase in particle concentration, and through it the resolution, is required to resolve fine features of complex near-wall turbulent flows that range from μm to sub-mm scales.

There is therefore a need to provide improved techniques for particle image velocimetry, that incorporate the advantages of DIH-PTV, while reducing or eliminating the limitations described above.

SUMMARY

According to some aspects, an apparatus utilized in Digital Fresnel Reflection Holography (DFRH) includes an input configured to receive incident light, a camera, and a beam splitter. The beam splitter is configured to direct the received incident light onto a sample via an imaging window and to direct reflected light to the camera for capture as two-dimensional holograms, wherein reflected light includes a reference wave reflected at the window and a backscattered wave reflected from particles within the sample.

According to some aspects, a digital fresnel reflection holography (DFRH) probe includes an input, a mirror, a beamsplitter, an objective lens and a camera. The input is configured to receive incident light and the mirror is positioned to reflect incident light to the beamsplitter, wherein the beamsplitter is positioned to receive light from the mirror and to direct light to an imaging window. In addition, the beamsplitter directs light reflected back through the imaging window to an objective lens, which focuses the reflected light and provides it to a camera for capture of a two-dimensional (2D) hologram. The reflected light includes a reference wave reflected from the imaging window and a backscattered wave reflected from particles within the sample.

According to some aspects, a method of imaging particles includes directing a collimated light beam to a beam splitter, wherein the beam splitter directs the collimated light beam to an imaging window. The method further includes directing reflected light received from the imaging window to an objective lens and an imaging camera and storing 2D holograms captured by the imaging camera, wherein the 2D hologram includes interference patterns associated with the interaction of a reference wave reflected from the imaging window and backscattered light reflected from particles within a sample.

BRIEF DESCRIPTION OF THE DRAWINGS

FIGS. 1A and 1B are schematic diagrams that illustrate one example of a Digital Fresnel Reflection Holography (DFRH) arrangement according to one or more aspects of this disclosure.

FIG. 2A is an image illustrating one example of a DFRH test arrangement used to perform a proof-of-concept experiment according to one of more aspects of this disclosure.

FIGS. 2B and 2C illustrate results of the proof-of-concept experiment made using the test setup shown in FIG. 2A according to one or more aspects of this disclosure.

FIGS. 3A and 3B illustrate results of a calibration experiment to validate DFRH results according to one or more aspects of this disclosure.

DETAILED DESCRIPTION

Figures 4A, 4B, 4C:
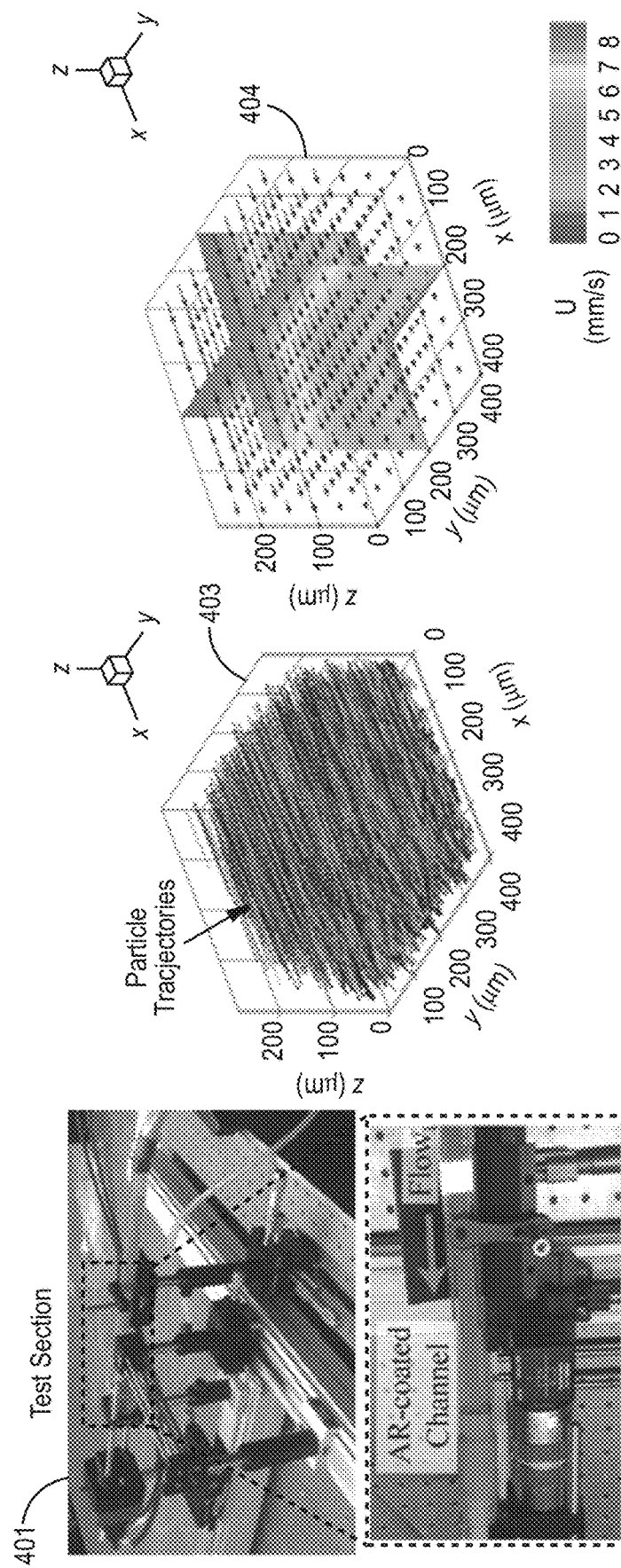
FIG. 4A includes images that depict a test setup for a controlled flow experiment according to one or more aspects of this disclosure.
FIGS. 4B and 4C illustrate results of a controlled flow experiment to validate DFRH results according to one or more aspects of this disclosure.

The present disclosure provides a system and method for digital holography using Digital Fresnel Reflection Holography (DFRH). In particular, the present disclosure is described with respect to particle tracking velocimetry (PTV) applications, but the DFRH systems and methods described may be utilized in other imaging applications as well. For PTV applications the instant disclosure is directed to devices, systems, and methods for utilizing a DFRH to capture particle tracking velocimetry information to analyze flow of a fluid (e.g., liquid or gas).

DIH Digital inline holography (DIH) is one solution for imaging particles in PTV applications. According to a typical DIH setup, a light source is arranged to illuminate a sampling volume for measurement of flow characteristics. According to such a typical DIH setup, a camera that captures holographic images is arranged to receive light scattered forward, relative to the light source, off of particles in the sampling volume. The camera is used to record in the form of a two-dimensional image comprised of patterns resulting from the interference (some destructive, some constructive) between the scattered light and unscattered light, but retains three-dimensional information regarding the particles imaged. This encoded information, known as a hologram, can then be used to reconstruct the shape and position of the particles that caused the scattering of light.

This disclosure describes techniques for using a DFRH arrangement to illuminate a sampling volume and record one or more holographic images representing characteristics of particle movement within a fluid sample volume, which may be reconstructed into a 3D representation to determine one or more characteristics of fluid flow in the sample volume. According to these techniques, incident light, such as from a laser or LED, may be shone on a sampling volume that contains a fluid (liquid or gas) to be measured. Particles may be disposed within the fluid, and light reflected back from the particles may be measured to determine various characteristics of movement of the fluid. Unlike typical DIH arrangements as described above, according to some aspects of this disclosure, a camera may be arranged to capture light reflected backwards (towards the light source) from the particles within the fluid sample. Such a DFRH arrangement as described herein may have many benefits over other techniques. For example, a DFRH arrangement may be capable of analyzing fluid flow of a sampling volume with a greater concentration of particles than DIH techniques. In addition, because the camera of a DFRH arrangement is arranged to capture backscattered light reflected from particles in the sampling volume, it may enable manufacture of more compact, easy to use, commercial, medical, or industrial devices to analyze fluid flow in 3D within a sampling medium with only a single optical access port (e.g., imaging window).

According to various aspects of this disclosure, light reflected from an imaging window arranged between a light source and a sampling volume may be used as a reference wave to interfere with backscattered light reflected from particles in the sampling volume. The interference with the backscattered light reflected from the particle and the reference wave reflected from the imaging window may create an interference pattern that is captured by the camera as a hologram. By using the light reflected from the imaging window as a reference, the techniques of this disclosure may provide for a simpler, more cost-effective, and/or smaller form factor setup in comparison with other techniques for capturing backscattered reflection to form a hologram that require an additional, separate light source to act as a reference wave for purposes of creating an interference pattern.

According to the various aspects of this disclosure, DFRH techniques may achieve significant improvements in comparison with other techniques for analyzing fluid flow characteristics. For example, the DFRH techniques described herein may exhibit a peak extraction efficiency value of 0.7 measured at a shadow density of ~150%. In comparison, DIH techniques as described above may exhibit a maximum extraction of ~0.2 under a shadow density of less than 10%.

FIGS. 1A and 1B illustrate one example of a Digital Fresnel Holography Reflection (DFRH) arrangement 100 according to various aspects of this disclosure. FIG. 1A depicts one example of a DFRH arrangement 100 configured to measure characteristics of fluid flow in sampling volume 105 held within a sampling chamber 115. FIG. 1B is a conceptual diagram that illustrates how light is used to capture a hologram 117 representing fluid flow in the DFRH arrangement 100 shown in FIG. 1A. Sampling volume 105 may include a fluid such as a liquid or gas, and one or more particles 114 may be dispersed within the fluid such that DFRH arrangement 100 can capture images resulting from light reflecting off the particles 114 in sampling volume 105 in order to measure characteristics of fluid movement within the sampling chamber 115.

As shown in FIG. 1A, DFRH arrangement 100 includes a light source 103, a beam splitter 104, an imaging window 106 arranged between the light source 103 and the sampling volume 105, an objective lens 102, and a camera 101. Light source 103 may be a laser as shown in FIG. 1, a light emitting diode (LED), or any other device configured to output light suitable to illuminate sampling volume 105.

According to the example of FIG. 1, incident light 111 from light source 103 passes through beam splitter 104 and imaging window 106 reaching sampling volume 105. A backscattered wave 123 is reflected from one or more particles 114 in sampling volume 105 through imaging window 106. In addition, a portion of incident light 111 is reflected back towards beam splitter 104 from imaging window 106. According to one example, the portion of incident light 111 reflected back from imaging window 106 may include both an inner wall reflection 112 and an outer wall reflection 113.

According to DFRH arrangement 100 shown in FIGS. 1A and 1B, at least some of incident light 111 reflected back from imaging window 106 may be used as a reference wave that interferes with backscattered wave 123 to create a hologram 117. Hologram 117 passes through beam splitter 104, which directs hologram 117 to camera 101 through objective lens 102. Camera 101 captures hologram 117 such that it may be processed to reconstruct a 3D representation of tracer particle movement within sampling volume 105, to enable analysis of fluid flow within sampling volume 105.

The arrangement 100 depicted in FIGS. 1A and 1B utilizes the natural properties of reflected light to interfere with backscattered wave 123 to form a hologram 117. As light reaches an interface with a discontinuity in refractive index, a fraction of the light is reflected back while the rest passes through. As shown in FIG. 1B, such a reflection includes both an outer wall reflection 113 and an inner wall reflection 112. The intensity of reflected light depends on the difference in the index of refraction between different mediums (e.g. ~4% for air-glass interface and ~0.35% for the glass-water interface for normal incidence of light in the example of FIG. 1B). According to one example, inner wall reflection 112 may be used as a reference wave to interfere with backscattered wave 123 to form hologram 117. According to other examples, one or more of inner wall reflection 112, outer wall reflection 113, or both may be used as a reference wave to interfere with backscattered wave 123 to form hologram 117.

In some examples, in order to maintain a high fringe contrast in hologram 117, a path length difference between backscattered wave 123 and the reflected reference wave may be selected to be within a coherence length of light source 103. In some examples, it may be preferable to reduce an intensity difference between the interfering waves (reference wave and backscattered wave 123) to be as close as possible to one another.

In some examples, a weaker reflection from the inner wall, which is both closer in intensity and path length difference to backscattered wave 123, may produce an interference pattern with the highest contrast.

In some examples, outer wall reflection 113 may act as a noise source which increases background intensity, and may cause a reduction in overall fringe contrast in the resultant hologram 117. In some examples, signal to noise (SNR) ration of DFRH arrangement 100 may be improved by either increasing scattered signal strength or reducing outer wall reflection 113. As one example, an anti-reflection coating could be applied to the outer wall of imaging window 106, to reduce an amount of light reflected by the outer wall (outer wall reflection 113).

The DFRH arrangement 100 shown in FIGS. 1A and 1B may provide benefits in comparison to other holography-based techniques for analyzing fluid movement, such as Digital Inline Holography (DIH). As one example, equation 1 below represents the DIH hologram formation process, while equation 2 represents the DFRH hologram formation process. As shown the recorded intensity for DFRH (Equation 2) yields an additional phase difference of $jk(z_1-z_2)$ in comparison to DIH (Equation 1). However, presence of this additional phase has been shown to not alter intensity reconstructions from a resultant hologram, and hence do not affect particle positions extracted through processing of a captured hologram 117.

$$I_{DIH} = |R + O|^2 = \qquad (1)$$
$$|\exp\{-jkz\} + \delta * h(x, y, z)|^2 = A_1 + 2Re\left\{\frac{jk}{2\pi z}\exp\left\{\frac{-jk}{2z}(x^2 + y^2)\right\}\right\}$$

$$I_{DFRH} = |R + O|^2 = |\exp\{-jkz_1\} + \delta * h(x, y, z_2)|^2 = \qquad (2)$$
$$A_2 + 2Re\left\{\frac{jk}{2\pi z}\exp\left\{\frac{-jk}{2z}(x^2 + y^2) + jk(z_1 - z_2)\right\}\right\}$$

Referring again to the example of DFRH depicted in FIGS. 1A and 1B, a hologram 117 captured by camera 101 may be processed to reconstruct a 3D image that represents movement of particle(s) 114 in sampling volume 105. In some examples, processing of a hologram 117 captured using DFRH arrangement 100 may utilize similar processing techniques used for conventional processing of a DIH hologram. For example, the processing of captured DFRH hologram 117 may include image preprocessing, numerical reconstruction, and segmentation. According to one non-limiting example, a 2D image may be processed to reconstruct a 3D representation of particle movement utilizing the various processing techniques described in U.S. patent application Ser. No. 15/422,041 filed Feb. 1, 2017 titled "System and Method for Digital Inline Holography," the contents of which are incorporated by reference herein in their entirety. In other embodiments, other well-known processing techniques may be utilized to reconstruct 3D representations of particle movement.

Image pre-processing may include Fourier domain filtering and time average background subtraction with conditional sampling to enhance fringe contrast.

As previously mentioned, hologram 117 may comprise an interference pattern between backscattered wave 123 and a reference wave reflected from imaging window 106. Hologram 117 may include a periodic variation in intensity (sinusoidal) over the entire image, which correspond to discrete peaks in the Fourier domain. In some examples, processing hologram 117 may include suppressing the image pattern by selectively masking out these peaks. In some examples, processing hologram 117 may include determining a time average background from a subset of all images to remove stationary artifacts such as dirt and defects in the optical path and boost the signal to noise ratio of the fringes. In some examples, processing hologram 117 further includes using a GPU-based iterative reconstruction algorithm, convolving with a Raleigh-Sommerfeld kernel, to identify a sparse representation of the 3D intensity field that generates the recorded hologram (Brady et al., 2009; Endo et al., 2016). In some examples, processing hologram 117 further includes determining a manual threshold and segmenting the reconstructed 3D intensity field and the particles extracted as intensity weighted centroids. In some examples, processing the hologram 117 further includes performing 3D Particle Tracking Velocimetry (3D-PTV). According to 3D-PTV, extracted positions of particle(s) 114 are tracked using a nearest neighbor routine to generate trajectories of particles from which velocities can be extracted (Crocker & Grier, 1996). In some examples, apart from generating trajectories, the tracking operation may also be used to validate extracted particles 114 and eliminate any noise introduced by the thresholding operation. Once particles have been validated and tracked, the size of sampling volume 105 may be determined along the depth direction in DFRH, by plotting a histogram of all particle positions (ensemble) and using a 5% cut-off on either side as limits.

Although not depicted herein, processing of captured hologram 117 may be performed by any device capable of processing a 2D representation of a hologram 117 into a 3D representation of the hologram in order to analyze fluid flow. For example, a general purpose processor may execute instructions stored on a tangible medium to process hologram 117. In other examples, specialized circuitry, such as a graphics processing unit (GPU), digital signal processor (DSP), or custom circuitry may be configured to process hologram 117. Such processing may take the form of any combination of hardware, firmware, or software.

FIGS. 2A-2C include images demonstrating a proof of concept experiment for one example of a DFRH arrangement 100 as shown in FIGS. 1A and 1B. FIG. 2A is a photographic image showing one example of a DFRH arrangement 200 used in the proof of concept experiment. As shown in FIG. 2A, the arrangement includes a light source 203 (OptoEngine 80 mW 532 nm solid state laser), a beam splitter 204, an objective lens 202 (Mitutoyo 10× Long Working Distance objective 0.28 NA), a camera 201 (Flare 2M360, 2048×1088 pixels, 30 fps), and a sample chamber 215 (acrylic sample chamber (50 mm×50 mm×10 mm with a wall thickness of 3±0.3 mm). The sample chamber 215 includes a fluid (liquid or gas) that includes one or more particles. According to the experimental example shown in FIGS. 2A-2C, sample chamber 215 includes particles (13 μm silver-coated hollow glass spheres) of fixed weight (0.12 g) in a 20 ml distilled water fluid, corresponding to a concentration of ~3000 particles/mm$^3$ (Shadow Density (SD) ~400%).

In the experimental example of FIGS. 2A-2C, silver coated particles were used to increase the strength of the backscattered wave reflected from particles in sample chamber 215, in order to enhance the signal to noise ratio (SNR) of fringe pattern in the resultant hologram. In addition, to reduce the reflection from the outer wall of the sample chamber 215 (e.g., outer wall reflection 113 depicted in FIG. 1B), a commercially available anti-reflection (AR) coated acrylic (from Acryllite Inc.) was used to make the sample chamber 215.

FIGS. 2B and 2C show results of experiments performed using DFRH arrangement 200 depicted in FIG. 2A. FIG. 2B at 210 depicts an image of a raw hologram (unprocessed) representing a 500 μm×500 μm field of view (1 μm/pixel) taken using DFRH arrangement 200. FIG. 2B at 220 depicts a corresponding enhanced Hologram after processing, including Fourier domain filtering, time-average subtraction and histogram equalization. FIG. 2C depicts a 3D rendering of trajectories reconstructed from a sequence of 300 holograms.

Due to fluctuation of numbers of particles in the sampling domain across a sequence of holograms, key metrics for evaluating the performance of DFRH arrangement 200, include sampling depth, particle concentration, effective resolution (e.g., averaged particle separation in the sampling domain), are calculated as ensemble-averaged quantities. In addition, according to the experiment described in FIGS. 2A-2C, the uncertainties of these metrics are represented using one standard deviation from the mean. Accordingly, as shown in 2C at 230, the reconstructed 3D tracks span a depth of ~300 μm, with over 93±10 particles extracted over a sequence of 300 holograms, resulting in an effective resolution of ~95±7 μm. In comparison, through local seeding, Sheng et al. (2008) and Talapatra & Katz (2013), achieve resolutions of 112±59 μm and 119±27 μm, respectively. Even though sampling depth is limited in DFRH, by eliminating local seeding, the experiment depicted in FIGS. 2A-2C was able to achieve a much higher and more consistent particle concentration (1240±133 particles/mm3 in current experiment vs 1062±707 particles/mm3 in Sheng et al. 2008 and 639±213 particles/mm3 in Talapatra & Katz 2013, respectively).

FIGS. 3A and 3B depict the results of a measurement calibration performed using an experimental setup such as DFRH arrangement 200 depicted in FIG. 2A. According to the example of FIGS. 3A and 3B, a calibration experiment was performed to compare reconstruction results to a ground truth, obtained through 3D scanning of the sample. Specifically, a water based gelatin seeded with particles (13 μm silver-coated hollow glass spheres) is prepared and allowed to cool in an Anti-Reflection coated acrylic cuvette, similar to the one used in the proof-of-concept experiment described above and depicted in FIGS. 2A-2C. Once the gel hardened, it was placed in the DFRH system (e.g., sample chamber 215 in the example of FIG. 2A), and a scan was performed utilizing the same optical path and recording parameters (1 μm/pixel) as the experiment described above with respect to FIGS. 2A-2C. According to the calibration experiment, the scanning operation moved the image focal plane through the sample, captured laser light scattered from the particles without requiring a numerical reconstruction. Furthermore, the translation was performed with a linear stage, over a range of 600 μm at a resolution of 10 μm/step, limited by the resolution of the micrometer. After completion of the scan, the sample was returned to its initial position a sequence of backscatter holograms were recorded while moving the sample in the lateral direction (x), in order to calculate an average background for image enhancement.

FIG. 3A depicts one example of a calibration image showing three specific particles 310, 311, and 312. Image 301 of FIG. 3A shows the pre-processed image along the x-y plane, while image 302 of FIG. 3A shows the same particles along the y-z plane. Images 301 and 302 depict the scanned intensity prior to processing to reconstruct the individual particles. Images 303 in FIG. 3A depicts each of the subject particles with reconstructed intensities after processing, along the x-y and y-z planes, respectively.

Specifically, FIG. 3A presents x-y and y-z slices from the scanned volume with three specific particles (310, 311, and 312) marked by boxes. The insets illustrate the corresponding slices around the three selected particles (based on highest intensity in the reconstructed volume) indicating a clear overlap between the two in all three directions. Additionally, 3B shows a plot of the longitudinal intensity profiles through the center of the three selected particles, which highlight a close match between their peaks. As shown in FIG. 3B, the peaks of the reconstruction and scanned results are within ±10 µm of each other, which corresponds to a value that is below the uncertainty for the particular linear stage used. The comparison shows that the DFRH techniques described herein provide accurate reconstruction (both lateral and longitudinal) of particle positions in three dimensions.

FIGS. 4A-4C depict another example of an experiment setup for testing the validity of DFRH to measure fluid movement. FIG. 4A depicts at 401 an example test setup of a DFRH arrangement. According to this experimental setup, a small-scale flow channel was used including a test section 250 mm in length and a square cross section (10 mm×10 mm). According to this experiment, the channel was made of the same anti-reflective coated acrylic described above with respect to the proof-of-concept experiment depicted in FIGS. 2A-2C. According to this experiment, the imaging window was located near the end of the channel to ensure a fully developed velocity field that does not change in the streamwise direction. This experiment used the same 13 µm glass particles used in the experiments described above with respect to FIGS. 2A-2C and 3A and 3B, with a concentration of ~1000 particles/mm3 (shadow density (SD) ~150%). According to this experiment, the camera recorded holograms at 700 fps with a pixel resolution of 0.8 µm/pixel. The flow speed was set to limit the maximum particle displacement, to be ~15 pixels (under the current recording condition) within two consecutive frames.

FIG. 4B depicts an ensemble of 3D trajectories of particles over a sequence of ~4000 holograms obtained using the described experimental setup. FIG. 4C depicts a corresponding ensemble-averaged 3D vector superimposed with contours of streamwise velocity.

As shown in FIG. 4B, the reconstructed 3D trajectories span a volume of ~400 µm×400 µm×270 µm capturing ~44±6 particles per frame on average (970 particles/mm3) over a sequence of 4000 holograms (~5.7 s), with a resulting mean particle separation of ~99±5 µm. In comparison, the proof-of-concept experiment depicted in FIGS. 2A-2C were performed under a higher particle seeding concentration (~2.5 times) and yielded a particle separation of ~95±7 µm. As shown in FIG. 4C, the calculated unstructured velocities were used generate a 3D velocity field on a regular grid of 50 µm spacing. The velocity vector at each grid point was estimated with data points located within a fixed search window (typically a multiple of grid size), by numerically solving a set of linear equations that models Taylor expansion in all three directions (Sheng et al., 2008; Talapatra & Katz, 2013).

Figures 5A, 5B:
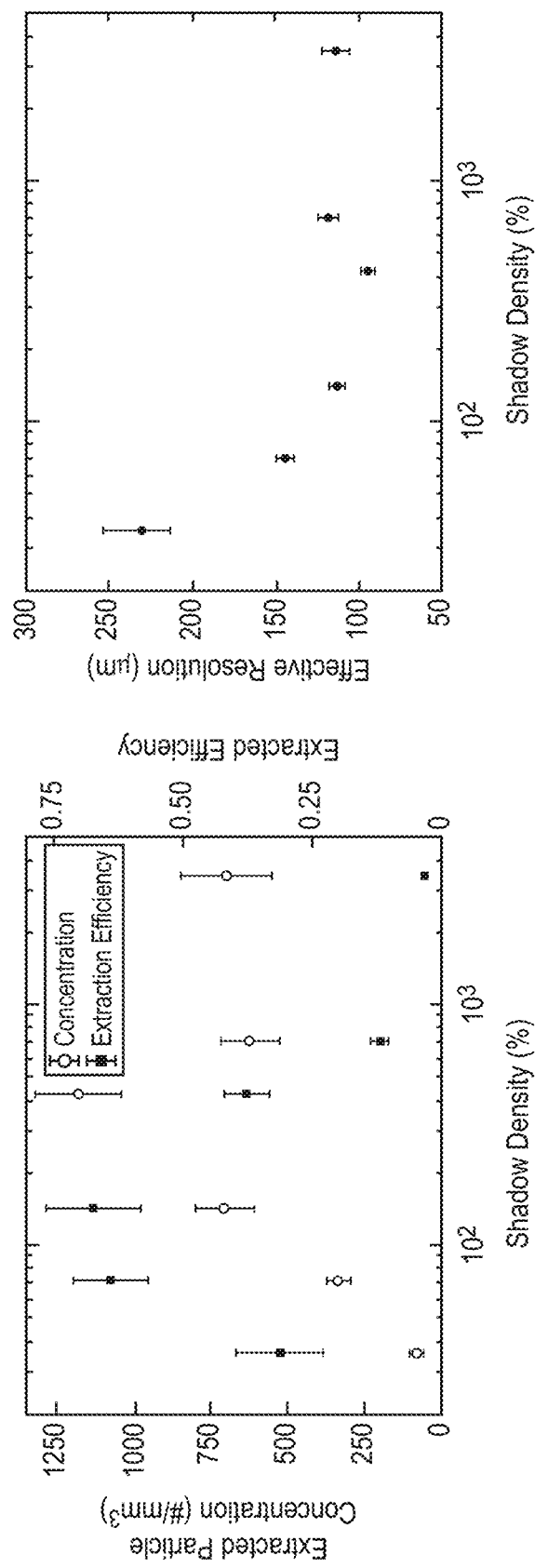
FIGS. 5A and 5B are graphical diagrams depicting the results of an experiment to evaluate seeding concentration vs. resolution when using DFRH according to one or more aspects of this disclosure.

FIGS. 5A and 5B depict the results of an additional experiment to evaluate the effect of particle seeding concentration on the effective resolution of DFRH measurements. According to this experiment, samples of different seeding concentrations were reviewed using the setup used in the proof of concept experiments depicted in FIG. 2A.

According to this experiment, seeding concentration was characterized in terms of a shadow density (SD), specifically to offer a comparison between the DFRH techniques described herein and DIH-PTV techniques for holographic imaging, although SD does not necessarily serve as a proper metric for holograms formed from backscattered signals. The recorded holograms were processed and the corresponding measurement metrics (i.e., extracted particle concentration and effective resolution) were calculated. Additionally, this experiment included computing extraction efficiency, defined as the ratio of extracted particle concentration to the seeding concentration, to offer comparisons with DIH-PTV experiments.

FIG. 5A is a graph showing the variation of extracted particle concentration and extraction efficiency as a function of shadow density. FIG. 5B is a graph showing effective spatial resolution as a function of shadow density. The error bars shown in FIGS. 5A and 5B indicate standard deviation over 300 samples.

FIGS. 5A and 5B summarize the variation of extracted particle concentration, the extraction efficiency and effective resolution with changes in shadow density (SD). Specifically, as shown in FIG. 5A, as the seeding concentration (characterized by its SD value) increases, the extracted particle concentration from the DFRH first rises to a peak of ~1200 particles/mm3 at a SD of 450%, and drops sharply with further increase of SD. This may be due to a decline in SNR at extremely high SD. The corresponding extraction efficiency exhibits a similar trend but reaches its peak value of 0.7 at slightly lower SD (~150%). In comparison, Malek et al. (2004), using inline holography, report a maximum extraction of ~0.2 under a shadow density that is less than 10%.

FIG. 5B depicts the effective resolution, which first improves with increasing SD and reaches a minimum value of ~95 µm (SD ~450%) under the current settings. With further increase in SD, due to a reduction in resolved volume, together with the drop in particle count (which may be caused by a weak SNR of particles located deeper in the sample), the resolution plateaus.

Figure 6A:
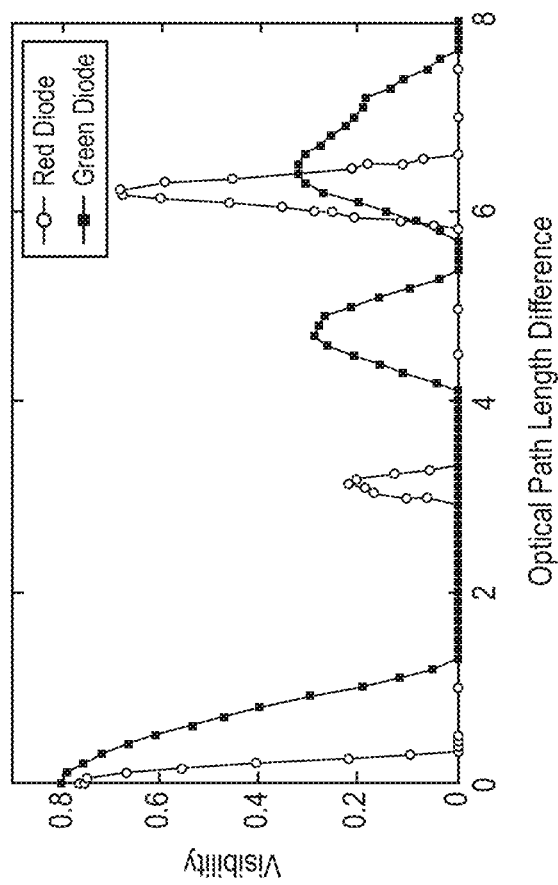
FIG. 6A illustrates a graph showing results of an experiment to determine the coherence profiles for different colored lasers as a light source according to one or more aspects of this disclosure.
Figure 6B:
FIGS. 6B and 6C depict images showing maximum intensity projection in the y-z plane using light of different coherence according to one or more aspects of this disclosure.
Figure 6C:
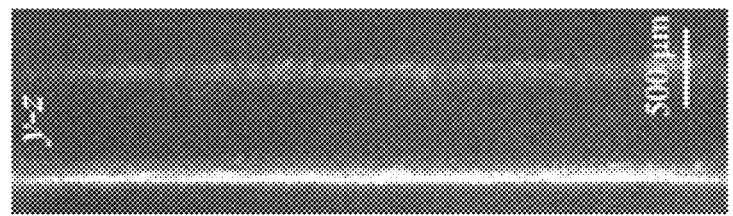
Figure 7A:
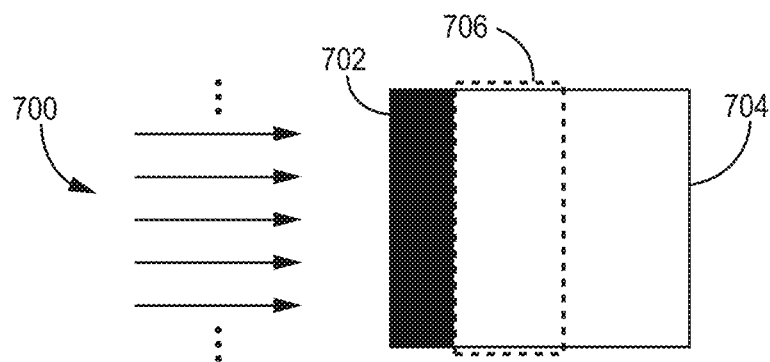
FIGS. 7A and 7B are schematic diagrams that illustrate imaging depths associated with a high coherence source and low coherence source, respectively, according to one or more aspects of this disclosure.
Figure 7B:
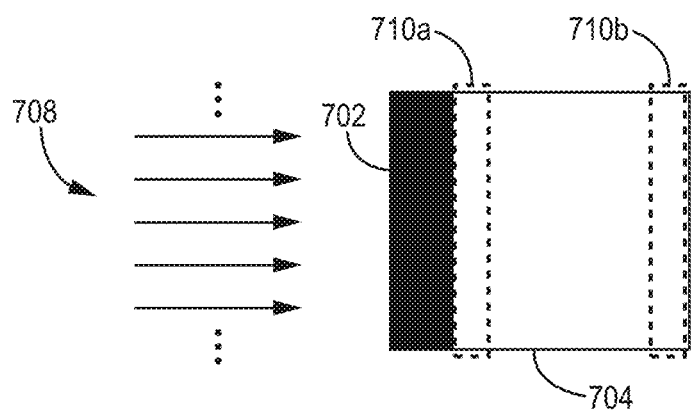

Referring now to FIGS. 6A-6C and 7A-7B, the effect of coherence profiles associated with the light source on particle imaging is depicted. In particular, FIGS. 6A-6C depict the results of an additional experiment to determine the coherence profiles for different lasers as a light source (e.g., light source 103 depicted in FIG. 1) and its effect on the sample volume (FIGS. 6B & 6C), while FIGS. 7A-7B illustrate schematically the regions imaged utilizing a high coherent light source and a low coherent light source, respectively.

The experiment depicted in FIGS. 6A-6C was performed using the DFRH arrangement depicted in FIG. 2A. This experiment tested the effect of coherence on the sampling domain of DFRH using two lasers of different coherence profiles, i.e., an Qphotonics 660 nm red diode laser (as a low coherence case) and a 532 nm green diode laser (as a relatively high coherence case). The coherence profile for each laser is represented as the variation of fringe visibility on a Michelson Interferometer, i.e., $(I_{max}-I_{min})/(I_{max}+I_{min})$ where $I_{max}$ and $I_{min}$ denote the maximum and minimum intensity associated with the central fringed, respectively. This experiment showed that fringe visibility directly influences the SNR of recorded holograms, with higher visibility leading to higher SNR. As shown in FIG. 6A, the coherence profile for the green laser consists of a wide central peak with a full-width-half-maxima (FWHM) of ~1.6 mm at the zero optical path-length-difference (OPLD=physical distance×refractive index of medium), and several weak secondary peaks located further away (4.8 and 6.4 mm respectively). In contrast, the red diode is characterized by a narrow primary peak (FWHM ~0.37 mm) and a significantly stronger secondary peak (of similar width) at an OPLD of ~6 mm. The sampling domain of DFRH, illustrated by the maximum intensity projection in the y-z plane shown in FIGS. 6B and 6C, highlighted the stark differences between the two sources. Specifically, the sampling domain under the low coherence (red) laser, was clustered around two specific depth positions (right next to the inner wall & 0.8 mm away from the inner wall), spanning a thickness of ~0.18 mm each, with no particles reconstructed in the region between them. On the other hand, the sample volume resolved by the high coherence (green) diode extends over ~0.8 mm with no apparent gaps in the reconstructed particle positions. Furthermore, the depth span of each sample volume closely matched the corresponding half-widths of the coherence peaks, i.e., 0.8 mm for the high coherence source and 0.18 mm for the other. Interestingly, for the low coherence (red) case, the sampling domain farther from the inner wall was not a result of the interference between the particle signal and the inner wall reflection, as it fell in the low visibility range of the laser coherence profile with an OPLD of ~0.8×1.33~1 mm. However, the OPLD between the particle signal and the outer wall reflection did end up falling within the secondary peak of high visibility. It is estimated that the OPLD for this scenario as ~3.3 mm×1.5+0.8 mm×1.33~6.04 mm, at the largest value of wall thickness, with an uncertainty limit specified by the manufacturer (±10%). The weaker reconstructed intensity of particles within the sampling domain father from the inner wall may be attributed to a reduced particle signal and the presence of the AR coating on the outer wall.

FIGS. 7A and 7B illustrate this effect schematically, wherein FIG. 7A illustrates DFRH imaging utilizing a high coherence source and FIG. 7B illustrates DFRH imaging utilizing a low coherence source. In general, a light source has high coherence if the source emits waves that span a narrow range of frequency or wavelength i.e. it is spectrally pure. A defining characteristic of a high coherence source is the ability of the waves to interfere with each other. As described above, the path length difference between a back-scattered wave (scattered by the particle) and the reflected reference wave (reflected from inner surface or outer surface of the imaging window) is selected to be within a coherence length of light source to allow them to interfere with one another. As shown in FIG. 7A, a high coherence source allows particles to be imaged at a depth (i.e., distance) from the imaging window that is within the coherence length of the light source. As shown in FIG. 7B, utilization of a low coherence source—characterized by a lower coherence length—images particles at a depth (i.e., distance) from the imaging window that is less than the imaging depth of the high coherence source. However, in some embodiments the low coherence source provides a secondary imaging depth, which can be linked to additional modes of laser oscillation away from the primary frequency and that is disconnected from the first imaging depth by a distance proportional to the optical path length of the laser cavity.

In the embodiment shown in FIG. 7A, high coherent source 700 is applied to a sample 704 via imaging window 702. The sample volume resolved by the high coherence light source is illustrated by dashed region 706, which extends from the imaging window 702 to a first depth with no apparent gaps in the reconstructed particle positions. In contrast, the embodiment shown in FIG. 7B illustrates application of a low coherent source 708 to sample 704 via imaging window 702. The sample volume resolved by the low coherence light source 708 is illustrated by dashed regions 710a and 710b, which are separated in depth from one another. Dashed region 710a is located adjacent to the imaging window 702 while dashed region 710b is located some distance from the imaging window. In some embodiments, the depth of imaging region 706 (high coherence source) is greater than the depth of imaging region 710a (low coherence source). FIGS. 7A and 7B illustrate the ability to image particles at different depths within the sample based on the coherence of the light source.

Figure 8A:
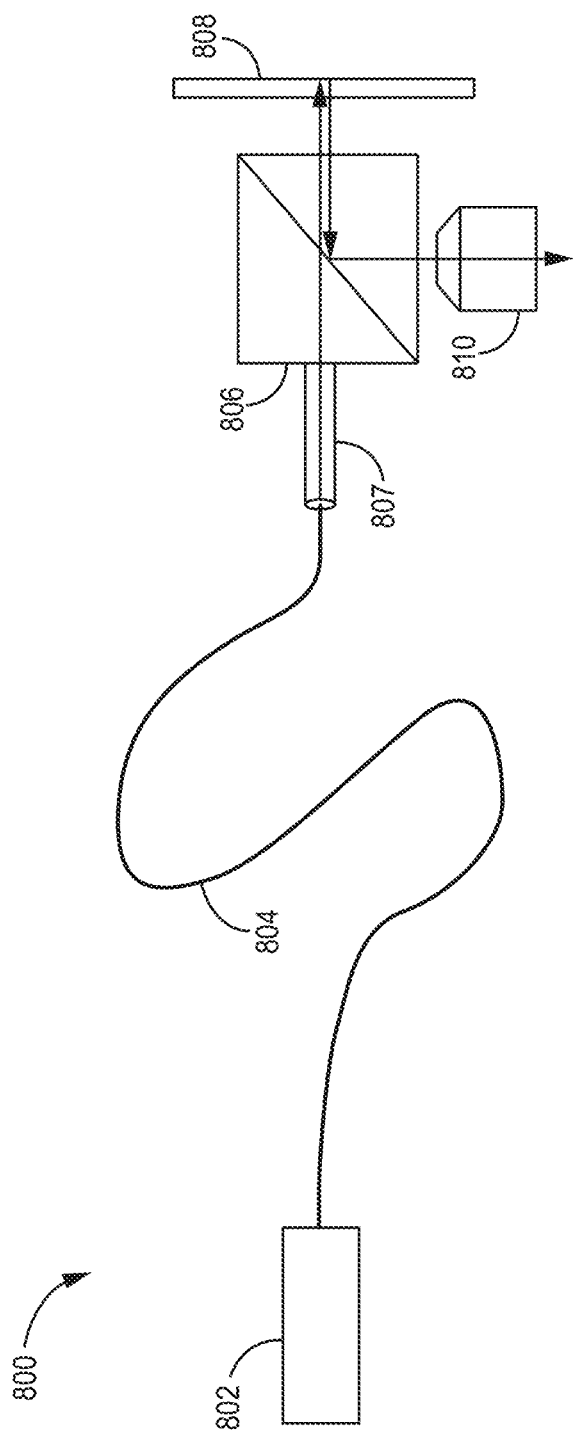
FIG. 8A is a schematic diagram of a Digital Fresnel Reflection Holography (DFRH) arrangement according to one or more aspects of this disclosure.
Figure 8B:
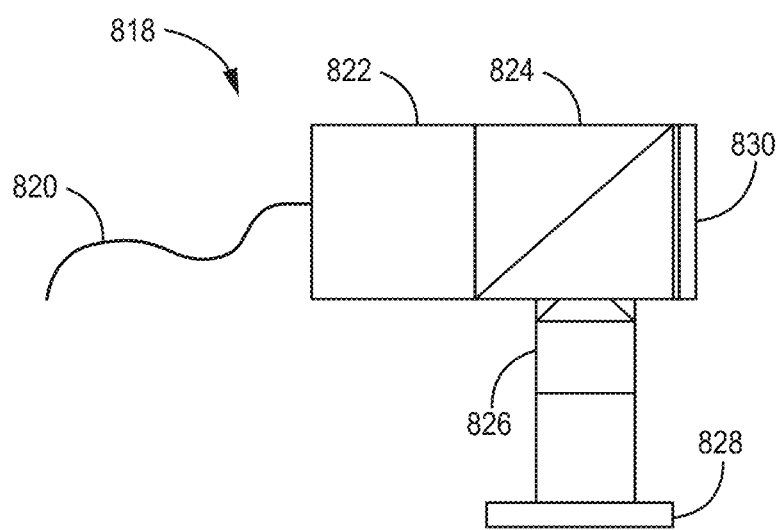
FIG. 8B is a schematic of a DFRH probe according to one or more aspects of this disclosure.

FIG. 8A is a schematic diagram of a Digital Fresnel Reflection Holography (DFRH) system 800 according to one or more aspects of this disclosure; and FIG. 8B is a schematic of a DFRH probe according to one or more aspects of this disclosure. In the embodiment shown in FIG. 8A, DFRH system 800 includes a light source (e.g., laser, LED, etc.) 802, optical fiber 804, beam splitter 806 and imaging lens 810. In some embodiments, the optical fiber 804 contains a collimator 807 at its end to collimate the beam of light provided to the beam splitter 806. In some embodiments, beam splitter 806 includes an input for connection to the optical fiber 804. Light received from optical fiber 804 is passed by the beam splitter 806 to the optical window 808. Light reflecting from the optical window as well as light backscattered by particles within the sample (not shown) a e reflected by the beam splitter 806 to imaging lens 810. In some embodiments, a benefit of utilizing optical fiber 804 to provide light from light source 802 to beam splitter 806 is the flexibility of the optical fiber 804 allows greater mobility in where the DFRH system is deployed. In addition, in some embodiments optical fiber 804 provides spatial filtering and removal of secondary transverse electromagnetic modes (TEM) present in the laser light. In the embodiment shown in FIG. 8A, beam splitter 806 and imaging lens 810 (image capture device not shown) are separate devices, and must be aligned and stabilized with respect to one another and with respect to optical window 808 in order to capture holograms with high SNR values. However, in other embodiments—such as that shown in FIG. 8B—the beam splitter 806, imaging lens 810 and image capture device are integrated into a single probe that can be utilized for DFRH measurements.

In the embodiment shown in FIG. 8B, DFRH probe 818 includes fiber collimator 822, a beam splitter 824, imaging lens 826, and image capture device 828. Fiber collimator 822 is configured to connect to or includes an optical fiber input 820, which is connected on a distal end to a light source (not shown). In some embodiments, fiber collimator 822 generates a collimated beam of approximately 5-10 millimeters (mm) diameter. Beam splitter is configured to provide light received at input connector 822 to imaging window 830 and to direct light reflected from imaging window 830 and backscattered from particles within the sample (not shown) to imaging lens 826 and image capture device 828. A benefit of integrating the input connector 822, beam splitter 824, imaging lens 826 and image capture device 828 in a single device is that it allows the DFRH probe 818 to be utilized in a portable manner.

In some embodiments, imaging window 830 includes a wedge geometry, wherein one face of the imaging window 830 is angled relative to the other face. In some embodiments, the front window of the imaging window 830 is angled to reflect the front wall reflection away from the beam splitter 824 and can contain optical coatings to modify the light reflected. In some embodiments, the image capture device 828 is a CMOS (complimentary metal-oxide-semiconductor) camera.

Figure 9:
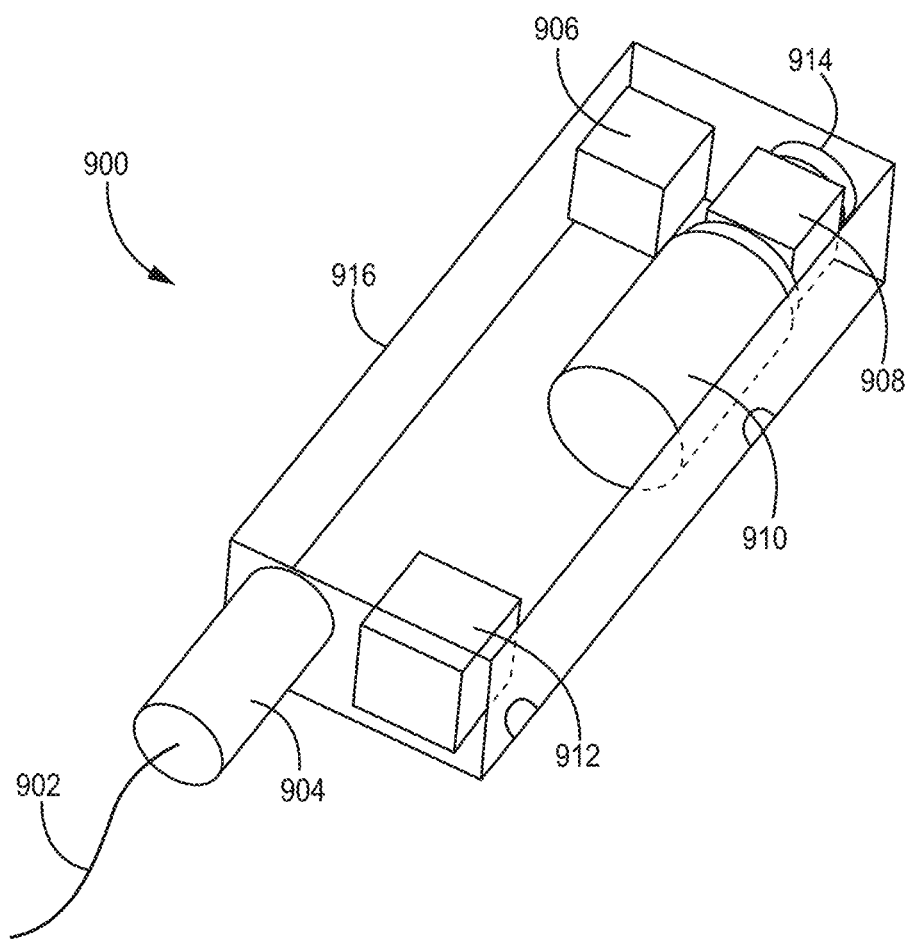
FIG. 9 is a schematic diagram of a DFRH probe according to one or more aspects of this disclosure.

FIG. 9 is a schematic diagram of a DFRH probe 900 according to one or more aspects of this disclosure. In some embodiments, DFRH probe 900 includes fiber collimator 904, turning mirror 906, beamsplitter 908, objective lens 910, camera 912, imaging window 914. In some embodiments, turning mirror 906, beamsplitter 908, objective lens 910, and camera 912 are included within a housing 916. In some embodiments, collimator 904 is located on an exterior of housing 916.

In some embodiments, a light source is provided to DFRH probe 900 via optical fiber 902, wherein the light source is provided to collimator 904. In the embodiment shown in FIG. 9, collimator 904 provides a collimated beam to turning mirror 906, which reflects the beam to beamsplitter 908. In some embodiments, beamsplitter 908 directs the collimated input beam to imaging window 914, which is positioned adjacent to or near a sample to be imaged. Reflected light—including light reflecting from the imaging window and backscattered light—is directed by the beamsplitter 908 to the objective lens 910 and camera 912. In this embodiment, DFRH probe 900 aligns the camera 912 with the imaging window 914 and places the collimator 904 adjacent to camera 912.

Figure 10:
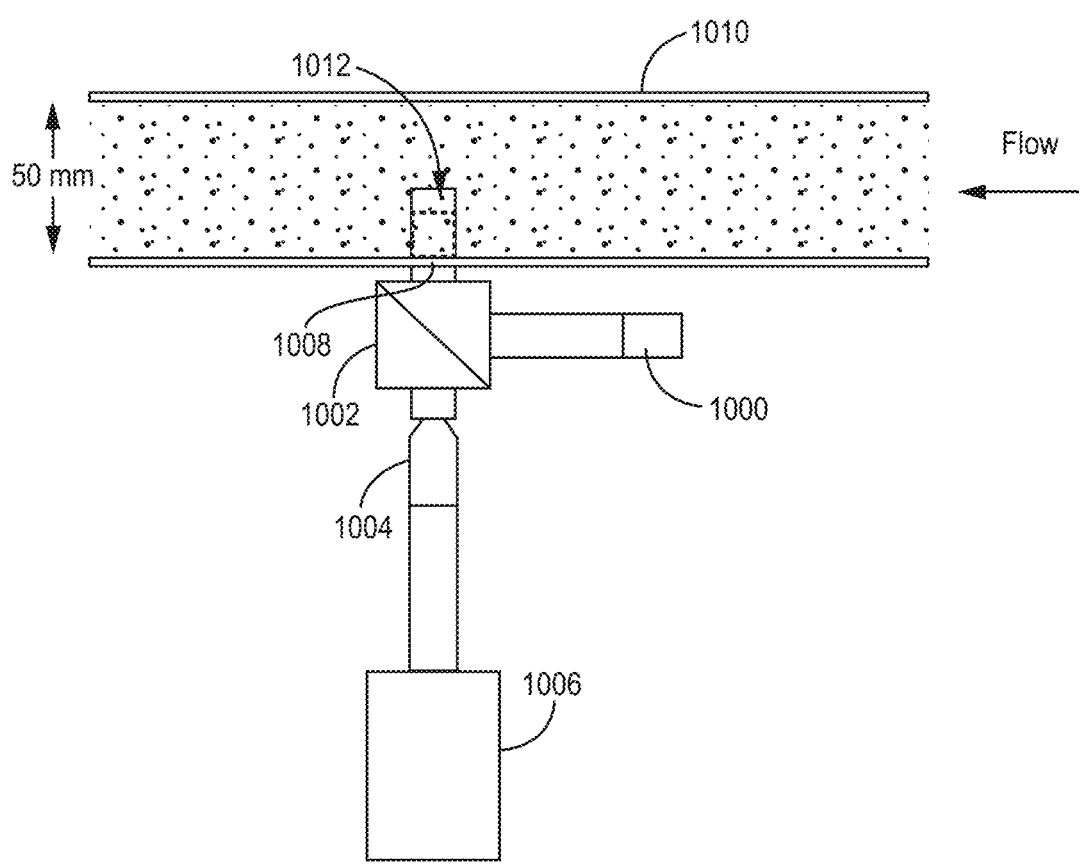
FIG. 10 is a schematic diagram of a DFRH probe positioned adjacent a pipe to monitor flow within the pipe according to one or more aspects of this disclosure.

FIG. 10 is a schematic diagram of a DFRH probe positioned adjacent a pipe to monitor flow within the pipe according to one or more aspects of this disclosure. The DFRH probe includes light source 1000, beamsplitter 1002, objective lens 1004, and imaging device 1006. In this embodiment, light source 1000 provides a beam of light to beamsplitter 1002, which directs the light towards imaging window 1008. Light reflected from imaging window 1008 and backscattered from particles within the sample are directed by beamsplitter 1002 to objective lens 1004 and imaging device 1006.

The embodiment shown in FIG. 10 illustrates measurement of fluid flow within a square channel 1010. According to this experiment, the imaging window was located near the end—lengthwise—of the channel to ensure a fully developed velocity field that does not change in the streamwise direction. This experiment used the same 13 μm glass particles used in the experiments described above with respect to FIGS. 2A-2C, 3A and 3B, and 4A-4C with a concentration of ~1000 particles/mm3 (shadow density (SD) ~150%). According to this experiment, the camera recorded holograms at 6000 fps with a pixel resolution of 1 μm/pixel. A benefit of the approach illustrated in FIG. 10 is the ability to image particles in a flow located adjacent to the wall of the flow structure—providing information regarding near wall flow structures. In some embodiments, the area 1012 imaged provides information on particle trajectories within the viscous sublayer.

Figure 11:
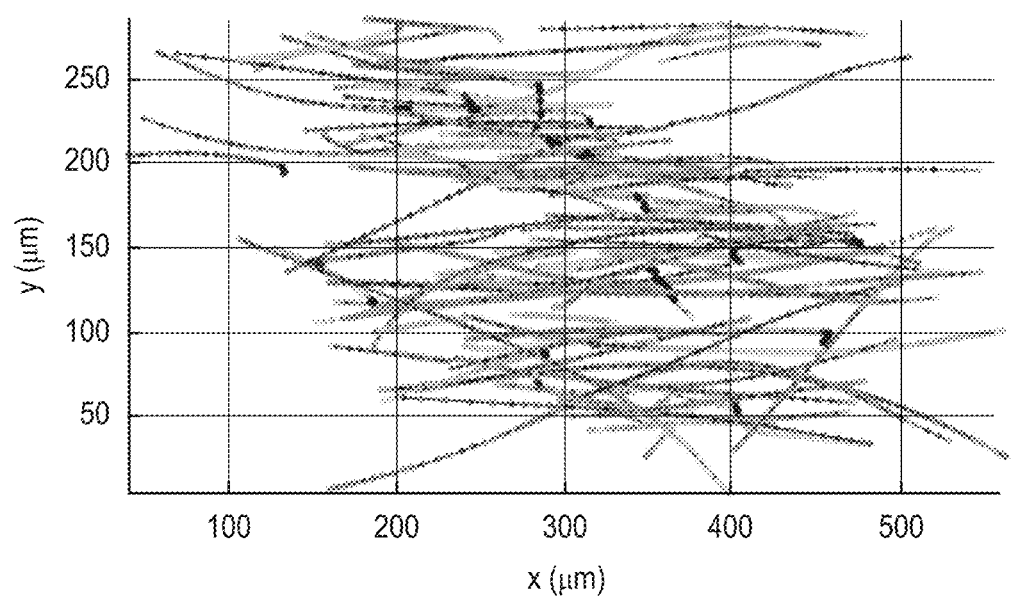
FIG. 11 is a screenshot illustrating the curved trajectory of a plurality of particles detected by the DFRH probe according to one or more aspects of this disclosure.

Experimental results associated with the embodiment shown in FIG. 10 was able to detect the laminar flow of particles within the imaged area 1012. In particular, experimental results detected significant changes in the trajectory of particles (e.g., curved trajectories) in the near wall structure. For example, FIG. 11 is a graph illustrating the trajectory of a plurality of particles (in x-y plane) detected within the sample at various points in time. As illustrated, the particles exhibit a curved trajectory. One of the benefits of the DFRH probe is the ability to image and detect the trajectories of particles along the flow surface (i.e., close to inner surface of sample wall).

This disclosure is directed to systems, devices, and methods for using DFRH as a backscatter holographic imaging system for near-wall 3D flow measurements. By utilizing the reflection at the solid-liquid interface (inner wall reflection 212 and/or outer wall reflection 213 depicted in FIG. 1B) as a reference beam, the approach significantly simplifies hologram recording in backscatter configuration by eliminating the need for a separate reference beam. Furthermore, the use of DFRH as described herein enables the use of processing algorithms developed for DIH-PTV without loss of generality. As described with respect to FIGS. 2A-2C, a proof-of-concept experiment has demonstrated that DFRH can achieve increased particle concentration (1240±133 particles/mm3) and superior resolution (95±7 μm) in comparison to prior studies using local seeding. As shown in FIGS. 3A and 3B, the accuracy of DFRH was also assessed through a comparison with the results from a manual scan of particles fixed in a gel. Moreover, as shown in FIGS. 4A-4C, DFRH is implemented for 3D velocity field measurements in a flow channel, resolving the near-wall flow field with a spatial resolution of ~99±5 μm. Finally, as shown in FIGS. 5A-5B, and 6A-6B, the effect of particle seeding concentration and laser coherence on several selected metrics of DFRH (e.g., sampling depth, extracted particle concentration, extraction ratio and effective resolution) were examined.

Although DFRH has shown great promise as a compact and an effective tool for near-wall flow diagnostics, it may still be limited in sampling depth and resolution for more demanding situations (e.g., high-Reynolds number turbulent flows). Any further improvements of these metrics may hinge primarily on the SNR of the recorded hologram. One potential improvement may involve the design of the custom AR-coating, to better suppress undesired reflection from the outer wall, enhance the reflection at the inner wall and boost the amount of light transmitted into the sample. Such improvements would be vital towards designing an optical probe capable of utilizing the reflected light from particles to perform flow diagnostics in a field environment where the use of conventional inline holography is still challenging e.g. large experimental facilities or setups with a single optical access port.

What is claimed is:

1. An apparatus comprising:
   an input configured to receive incident light;
   a camera;
   an objective lens; and
   a beam splitter configured to direct the received incident light perpendicularly through an imaging window and onto a sample located behind the imaging window, the beam splitter further configured to direct reflected light through the objective lens to the camera for capture as two-dimensional holograms, wherein reflected light includes a reference wave and a backscattered wave reflected from particles within the sample, wherein the reference wave is reflected from the imaging window located in front of the sample.

2. The apparatus of claim 1, wherein the reference wave is reflected from an inner wall of the imaging window.

3. The apparatus of claim 1, wherein the reference wave and the backscattered wave interfere with one another to create a hologram captured by the camera.

4. The apparatus of claim 1, wherein the received incident light has a coherence selected based on a depth of desired particle imaging.

5. The apparatus of claim 4, wherein incident light from a high coherence source provides imaging of particles located near an imaging window.

6. The apparatus of claim 4, wherein incident light from a low coherence source provides imaging of particles located at a first depth located near an imaging window within the sample and at a second depth greater than the first depth.

7. The apparatus of claim 1, further including a processor configured to process the captured 2D holograms to reconstruct a 3D representation of particles within the sample.

8. A digital fresnel reflection holography (DFRH) probe comprising:
   an input configured to receive incident light;

a beamsplitter positioned to receive light from the input and to direct light perpendicularly to a sample through an imaging window located in front of the sample, and to receive reflected light from an imaging window, wherein reflected light includes a reference wave reflected from the imaging window located in front of the sample and a backscattered wave reflected from particles within the sample;

an objective lens positioned to focus reflected light provided to the beamsplitter; and a camera positioned to capture a two-dimensional (2D) hologram based on the reflected light.

9. The DFRH probe of claim 8, further including a collimator located at the input of the DFRH probe.

10. The DFRH probe of claim 8, wherein the objective lens and the camera are aligned with the imaging window.

11. The DFRH probe of claim 8, wherein the objective lens and the camera are located perpendicular to the imaging window.

12. The DFRH probe of claim 8, further including a mirror positioned to receive incident light from the input and the reflect the incident light to the beamsplitter.

13. A method of imaging particles, the method comprising:

directing a collimated light beam to a beam splitter, wherein the beam splitter directs the collimated light beam to a sample through an imaging window located in front of the sample, wherein the collimated light beam is directed perpendicular to the imaging window;

directing reflected light received from the imaging window to an objective lens and an imaging camera, wherein the reflected light includes a reference wave reflected from the imaging window located in front of the sample and a backscattered wave reflected from particles within the sample; and storing 2D holograms captured by the imaging camera.

14. The method of claim 13, wherein the collimated light beam is a high coherence light beam.

15. The method of claim 13, wherein the collimated light beam is a low coherence light beam.

16. The method of claim 13, wherein the 2D hologram includes interference patterns associated with the interaction of a reference wave reflected from the imaging window and backscattered light reflected from particles within a sample.

\* \* \* \* \*